(12) United States Patent
Saint Jalmes

(10) Patent No.: US 7,025,306 B2
(45) Date of Patent: Apr. 11, 2006

(54) INDIVIDUAL MODULE FOR AIRCRAFT PASSENGERS

(75) Inventor: Bruno Saint Jalmes, Toulouse (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 10/441,399

(22) Filed: May 20, 2003

(65) Prior Publication Data

US 2003/0218095 A1    Nov. 27, 2003

(30) Foreign Application Priority Data

May 22, 2002    (FR)    ................................ 02 06239

(51) Int. Cl.
 *B64D 11/06*    (2006.01)
(52) U.S. Cl. ................................ 244/118.6; 244/122 R
(58) Field of Classification Search ............ 244/118.5, 244/118.6, 122 R, 122 AH, 119, 117 R; 5/9.1; 119/771; 297/464–488; 114/192
See application file for complete search history.

(56) References Cited

U.S. PATENT DOCUMENTS

| | | | |
|---|---|---|---|
| 3,784,989 A * | 1/1974 | LeGrand ......................... 5/9.1 |
| 5,083,727 A * | 1/1992 | Pompei et al. ............. 244/118.6 |
| 6,209,956 B1 * | 4/2001 | Dryburgh et al. ............. 297/245 |
| 6,851,134 B1 * | 2/2005 | Freller ............................. 5/9.1 |
| 2002/0070314 A1 * | 6/2002 | Schmidt-Schaeffer .... 244/118.6 |
| 2003/0085597 A1 * | 5/2003 | Ludeke et al. ......... 297/184.14 |
| 2003/0218095 A1 * | 11/2003 | Saint Jalmes ............ 244/118.5 |
| 2004/0195451 A1 * | 10/2004 | Bentley et al. ........... 244/118.6 |
| 2004/0227034 A1 * | 11/2004 | Wentland et al. ............ 244/119 |
| 2004/0232283 A1 * | 11/2004 | Ferry et al. ............... 244/118.6 |
| 2005/0001098 A1 * | 1/2005 | Saint-Jalmes ............ 244/118.6 |
| 2005/0011992 A1 * | 1/2005 | Ueng ....................... 244/118.5 |
| 2005/0067870 A1 * | 3/2005 | Rezag et al. ............ 297/354.13 |
| 2005/0189451 A1 * | 9/2005 | Mercier .................... 244/118.6 |
| 2005/0189804 A1 * | 9/2005 | Mercier ....................... 297/232 |

FOREIGN PATENT DOCUMENTS

| | | | | |
|---|---|---|---|---|
| EP | 1 162 138 A | | 12/2001 | |
| GB | 2362095 | * | 11/2001 | .............. 244/118.6 |
| JP | 08258796 | * | 10/1996 | .............. 244/118.6 |
| WO | WO 00 21831 A | | 4/2000 | |

* cited by examiner

*Primary Examiner*—Teri Pham Luu
*Assistant Examiner*—Stephen A. Holzen
(74) *Attorney, Agent, or Firm*—VanOphem & VanOphem, P.C.

(57) ABSTRACT

A seating module for aircraft passengers including an individual seat which has a seat cushion, a seat back and arm rests and is adapted to be oriented in a longitudinal direction of the aircraft. The seating module further includes an upright vertical wall structure having a fitting or compartment facing and spaced a distance from the individual seat which is narrower than the width of the individual seat. The seating module has a straight lateral wall extending between one side of the individual seat and one side of the fitting, which has a height at least at the level of the seat cushion. The straight lateral wall, the individual seat and the fitting define an elongate space having a wider end occupied by the individual seat and a narrower end occupied by the fitting. An access opening is disposed between the ends and opposite the straight lateral wall.

45 Claims, 4 Drawing Sheets

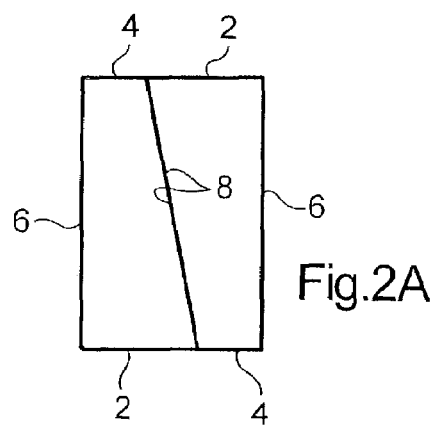
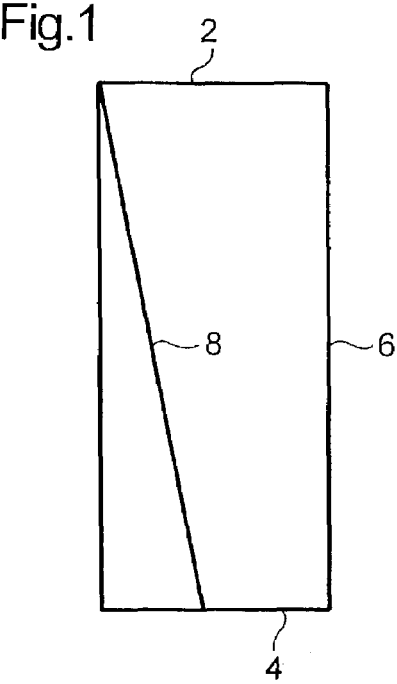
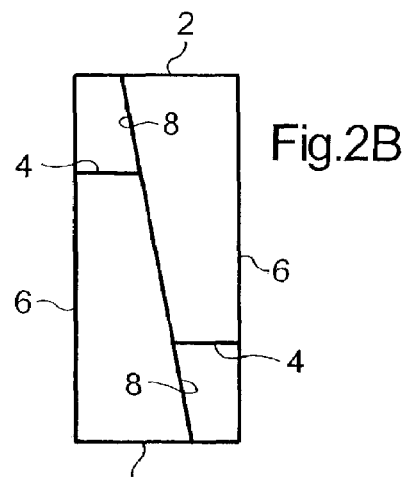
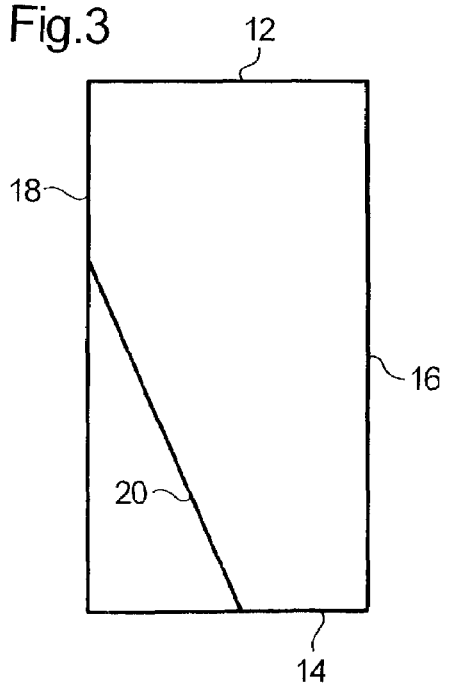
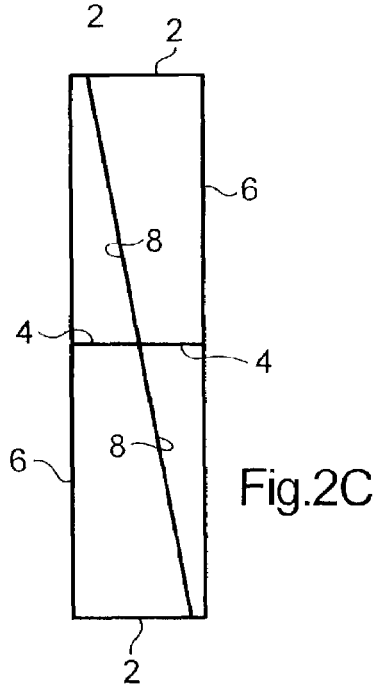

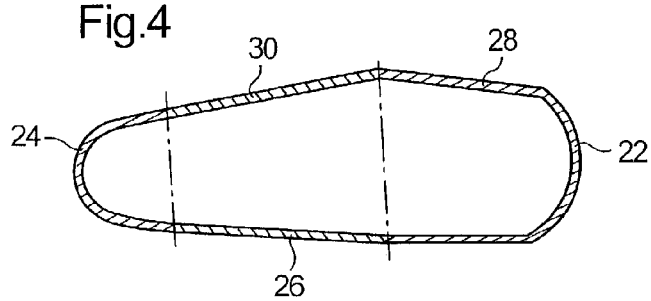
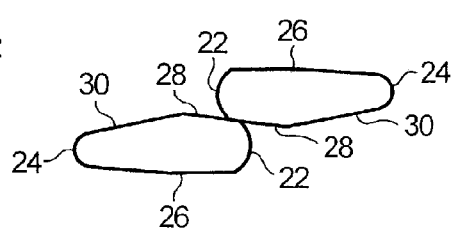
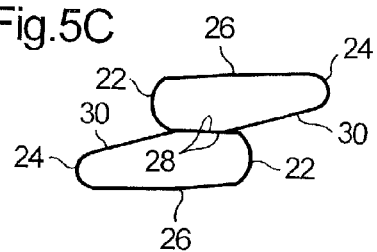
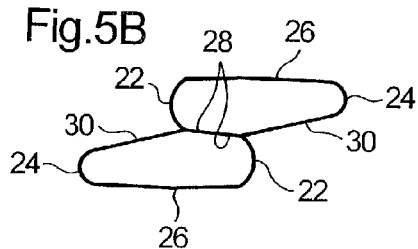
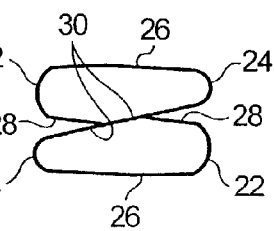
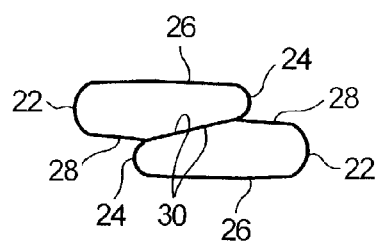
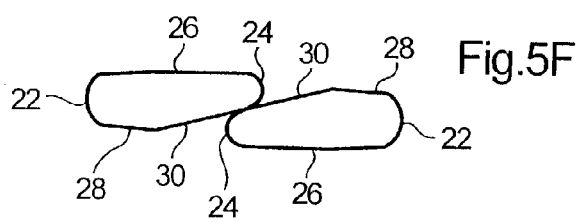

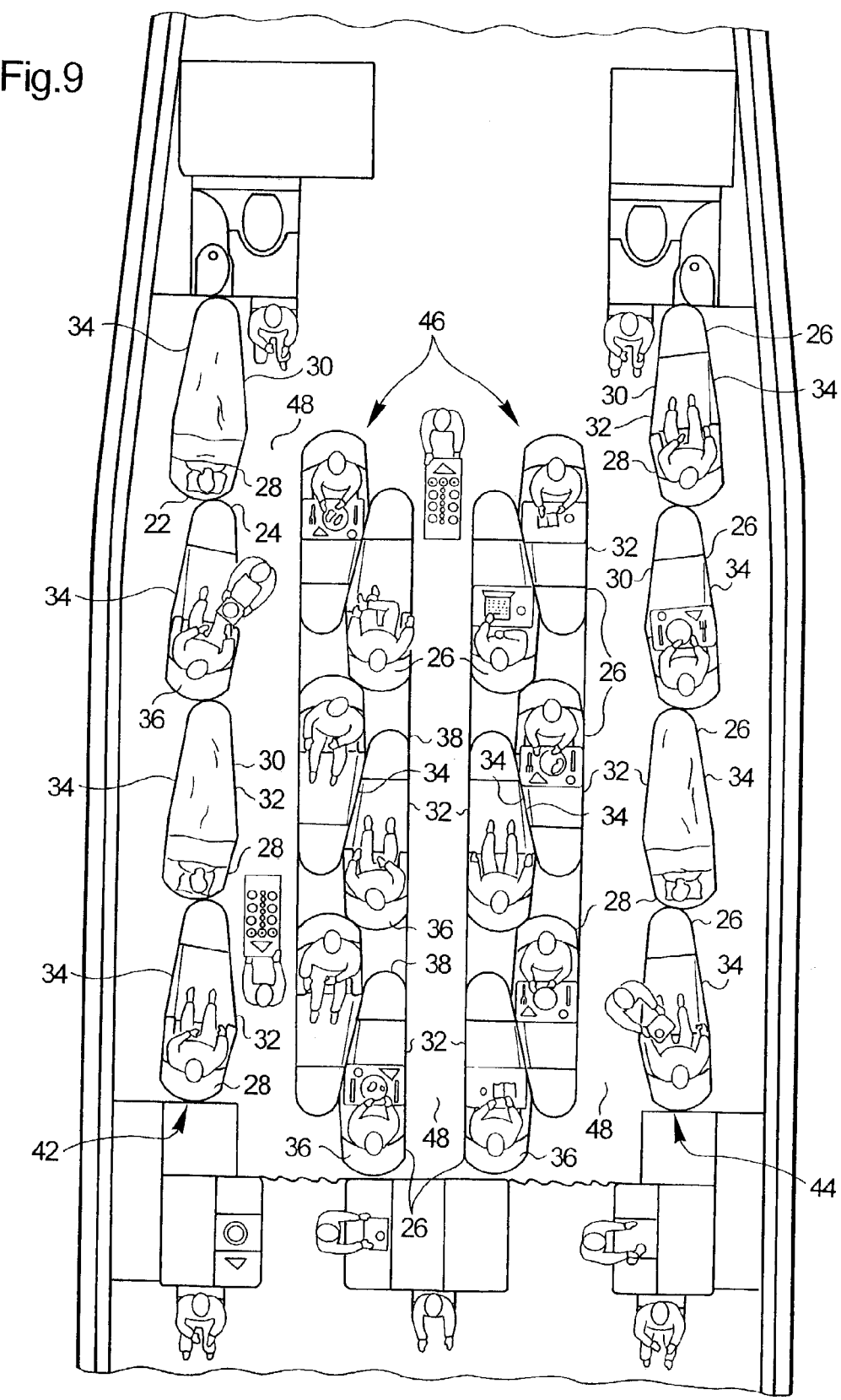

INDIVIDUAL MODULE FOR AIRCRAFT PASSENGERS

BACKGROUND OF THE INVENTION

1. Field of the Invention

The present invention relates to an individual module for aircraft passengers.

2. Description of the Prior Art

Each passenger on an aircraft has a seat. Prior art aircraft seats are generally disposed in rows transverse to the direction of movement of the aircraft with the seats facing forward in the aircraft. Sometimes there are different compartments for different classes. The seats are then more or less spaced, more or less comfortable, and more or less adaptable (inclinable seat backs, inclinable seats, seats that convert into a bed, etc.).

The seats are generally oriented in the same way in all classes. Each passenger is therefore allocated a substantially rectangular space and these rectangular spaces are aligned in rows and columns within the cabin of the aircraft.

Constraints apply to this alignment. Aisles must be provided for passengers to move around in and for their evacuation in an emergency. Emergency exits must also be provided. In particular, it must be possible to evacuate the aircraft within a time period defined by a pre-established standard. Passengers must also be seated during take-off and landing and be oriented longitudinally relative to the aircraft (in the direction of movement or in the opposite direction).

An object of the present invention is to provide an aircraft cabin arrangement such that a greater number of passengers can be accommodated in the same space without compromising safety.

SUMMARY OF THE INVENTION

To this end, the present invention proposes an individual module for an aircraft passenger, the module including a seat adapted to be oriented in a longitudinal direction of the aircraft and having an elongated shape with a wider end and a narrower opposite end. The two ends being connected by a substantially straight side and by a side having a substantially straight segment extending from the narrower end toward the wider end and diverging from the opposite substantially straight side.

Because of its divergent side, a module of the above kind can be positioned or nested against another, identical module so that the two inclined sides lie one against the other, and the two modules can slide relative to each other along these inclined sides. A large number of combinations of modules of relative positions for the above kind is then possible. In this way, the internal space of an aircraft can easily be adapted for optimum occupation.

An individual module for an aircraft passenger in accordance with the invention has the shape of a right-angle trapezium, for example.

A different embodiment of the module further includes, for example, a substantially rectilinear first end, a substantially rectilinear second end narrower than and substantially parallel to the first end, a substantially straight side connecting the two ends and substantially perpendicular to the two ends, and a side opposite the substantially straight side, also connecting the two ends, and having a first substantially straight segment extending from the second end toward the first end and diverging from the opposite substantially straight side and a second segment connecting a free end of the first segment to the first end.

In this embodiment, the second segment can be substantially parallel to the opposite straight side, or the second segment can extend from the first end toward the second end and diverge from the opposite straight side. In this latter variant, the divergence angle of the first segment is preferably greater than the divergence angle of the second segment.

The present invention also proposes an individual module for an aircraft passenger, the module including a seat having a seat cushion, a seat back and arm rests. The module is adapted to be oriented in a longitudinal direction of the aircraft, and also includes a fitting or compartment facing and at a distance from the seat and narrower than the seat; a lateral wall extending between one side of the seat and one side of the fitting at least at the level of the seat cushion and the lateral wall; the seat and the fitting defining an elongated space having a wider end occupied by the seat, a narrower end occupied by the fitting, and an access opening between the ends and opposite the lateral wall.

This space has a contour that widens from each end. In this case, the narrower end preferably widens less than the wider end so that the space has an area of maximum width that is nearer the wider end than the narrower end.

The ends each have a branch that is substantially aligned with a branch of the other end. In this case, the lateral wall is disposed between the branches opposite those that are substantially aligned with each other.

In one embodiment of the invention, the ends of the elongated space can each be defined by a U-shaped end wall. In this case, the lateral wall extends from one end wall to the other. The U-shaped end walls are preferably each provided with fixing means for fixing them to longitudinal fixing rails disposed in the floor of the cabin. Thus, it is possible to employ means for fixing these walls that are identical or virtually identical to the fixing means usually employed to fix a prior art aircraft seat to the floor of an aircraft cabin.

The lateral wall can be of varying height. The opening preferably has a horizontal dimension equal to the width of the lateral wall.

The fitting advantageously has a surface at a height equal to that of the seat cushion to within approximately 10 centimeters, at a height from 0.45 m to 0.60 m. The end walls have a height from 0.45 m to 1.50 m.

The seat is a convertible seat, whose seat back can be inclined toward the rear, preferably as far as a horizontal configuration.

The module preferably has a length from 1.80 m to 2.10 m. This length means that a passenger can be accommodated with sufficient room to stretch out without disturbing his neighbor. For a passenger to be comfortable, the maximum width of the module can be from 0.50 m to 0.70 m.

The present invention also provides combinations of at least two modules according to the invention.

Thus, there is provided a pair of modules according to the invention disposed head-to-tail and in contact with each other and having identical contours. Various configurations of a pair of modules are defined in the dependent claims.

The present invention further provides a row of modules according to the invention wherein the modules define identical spaces and are disposed in alignment with each other with identical orientations and the openings of the modules are aligned with each other. For example, two successive modules have their respective narrower ends in the immediate vicinity of their wider ends.

The present invention further provides a group of modules formed of modules disposed in two rows to form a succession of pairs of modules.

It further provides a section of the aircraft cabin having a plurality of modules in accordance with the invention, and in particular when the modules are arranged as defined in the dependent claims relating to this kind of section.

Details and advantages of the invention will emerge from the following description, which is given with reference to the accompanying drawings.

BRIEF DESCRIPTION OF THE DRAWINGS

FIG. 1 is a diagram showing a first example of a module according to the invention.

FIGS. 2A to 2C are diagrams showing a combination of two FIG. 1 modules.

FIG. 3 shows a variant of the FIG. 1 module.

FIG. 4 shows another variant of the FIG. 1 module.

FIGS. 5A to 5F show two cooperating FIG. 4 modules.

FIG. 6 is an exploded view of the FIG. 4 module.

FIGS. 7 and 8 each show a variant of the FIG. 4 module.

FIG. 9 shows a section of the aircraft cabin equipped with individual modules according to the invention.

DETAILED DESCRIPTION OF THE PREFERRED EMBODIMENTS

Figure 10:
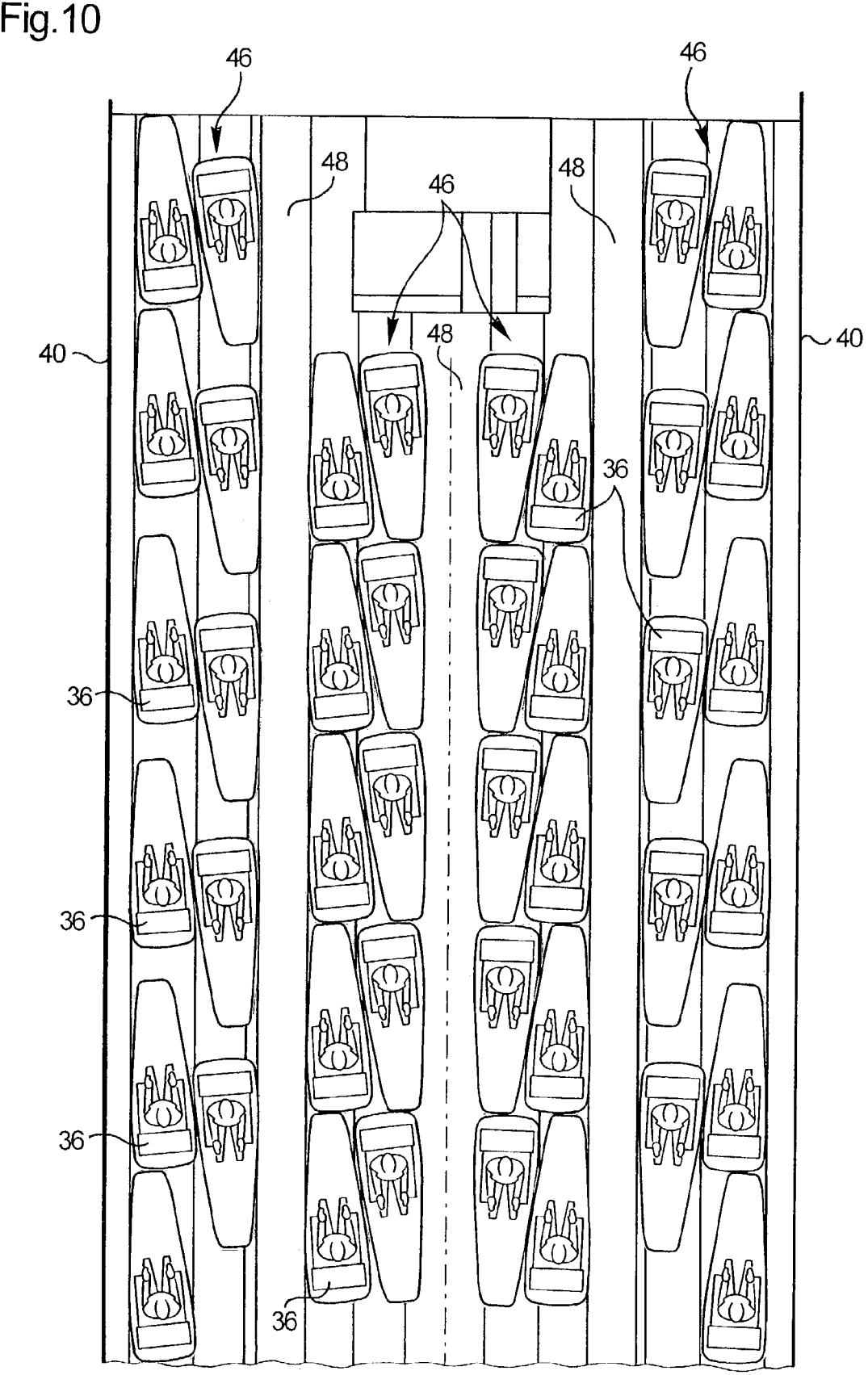
FIG. 10 shows another cabin section equipped with individual modules according to the invention in a configuration different to that shown in FIG. 9.

FIG. 1 is a plan view of the space provided for a passenger in an aircraft cabin. This space receives a seat, which may be convertible into a bed, and possibly other accessories such as a locker, a television, a footrest, etc. The space equipped in this way defines a module fitting within an elongated right-angle trapezium, the side perpendicular to the bases of the trapezium being substantially longer than each of the bases. Thus, this space has a larger base 2, a smaller base 4, a straight longer side 6, and an inclined longer side 8.

FIGS. 2A to 2C show how two modules like that shown in FIG. 1 can cooperate to occupy optimally the space available in an aircraft cabin. In these three figures, the two modules are placed head-to-tail, with their inclined longer sides 8 in contact with each other.

In FIG. 2A, the inclined longer sides 8 are in contact with each other over their entire length. The larger base 2 of one module is then aligned with the smaller base 4 of the other module. The combination of the two modules has a compact rectangular overall shape. This configuration is short (as measured in the direction defined by the straight longer sides 6) but wide (as measured in the direction defined by the bases).

Conversely, FIG. 2C shows a long but narrow configuration of two modules. The two modules are offset and their two smaller bases 4 are aligned. The length of the combination is twice the length of a module, but the width of the combination is not much greater than that of a single module, whereas in the first configuration (FIG. 2A) the length of the combination corresponds to the length of a single module and the width corresponds to the sum of the lengths of the larger and smaller bases 2 and 4.

FIG. 2B shows one intermediate position obtained by sliding the individual modules relative to each other along the inclined longer sides 8. There is a large number of intermediate positions to choose from.

This modular design adapts perfectly to the aircraft cabin in which the modules are installed. In an aircraft cabin, two dimensions are important with respect to placing the seats, and thus to placing the modules in the present context; they are the distance between two emergency exits and the width of the cabin. The modularity provided by the shape of the modules optimizes the number of modules, and therefore the number of passengers, that can be accommodated in a cabin section between two emergency exits.

FIG. 3 shows a different embodiment of a module according to the invention. The module is no longer the shape of a trapezium. However, there are two parallel shorter sides 12 and 14, a straight longer side 16 perpendicular to the shorter sides 12 and 14, and another longer side facing the straight longer side 16. As in the FIG. 1 embodiment in the shape of a trapezium, the two shorter sides 12 and 14 are different lengths. The shorter side 14 is shorter than the shorter side 12. By analogy with a trapezium, the shorter side 12 is referred to as the longer base and the shorter side 14 is referred to as the shorter base. The difference compared to the FIG. 1 module concerns the side opposite the straight longer side 16. This side comprises two segments. A first segment 18 is disposed at a right angle to one end of the larger base 2 (and is therefore parallel to the straight longer side 16). An inclined second segment 20 connects the free end of the straight first segment 18 to the shorter base 14.

In the same way that the modules in the shape of a trapezium (FIGS. 1 and 2) can cooperate with one placed against the other, with the inclined longer sides 8 facing each other, two FIG. 3 modules can cooperate with one placed against the other, with the two inclined second segments 20 facing each other. It is again possible to produce configurations that are either compact (short and wide, as in FIG. 2A) or elongated (long and narrow, as in FIG. 2C).

FIG. 4 shows a preferred embodiment. It shows a generally elongated module with two ends, one narrower than the other. In this embodiment, compared to the FIGS. 1 and 3 embodiments, the ends are curved rather than straight. In principle, there is a wider end 22 comparable to the larger and longer bases 2 and 12 of FIGS. 1 and 3 and a narrower end 24 comparable to the smaller and shorter bases 4 and 14 of FIGS. 1 and 3.

The two wider and narrower ends 22 and 24 are connected by a straight longer side 26. The two wider and narrower ends 22 and 24 are both on the same side of the straight longer side 26 and substantially perpendicular thereto.

Here the side opposite the straight longer side 26 also comprises two segments. A first segment 28 extends from the wider end 22, on the side opposite the straight longer side 26, and diverges from the straight longer side 26. The divergence angle is from 3° to 10°, for example 4°.

The second segment 30 starts from the narrower end 24, on the side opposite the straight longer side 26, and also diverges from the straight longer side 26. The divergence angle is greater than that of the first segment 28 and in this example is from 5° to 20°, for example 8°.

FIGS. 5A to 5F show examples of relative positions of two modules like that shown in FIG. 4. The modules have two inclined sides. As previously stated, the modules cooperate when they are placed one against the other, with two similar inclined sides facing each other. FIGS. 5A to 5C show three configurations in which the first segments 28 are in contact with each other and FIGS. 5D to 5F show configurations in which the second segments 30 of the two modules are in contact with each other.

The configurations shown in FIGS. 5A to 5C are relatively long. Given the relatively small angle between the first segment 28 and the straight longer side 26, the width difference for these three configurations is not large. It is nevertheless very beneficial when the modules are installed in a cabin section whose width varies. The width variations are generally small and are generally encountered aft of the cockpit and forward of the tail of an aircraft. These configurations have the advantage of providing passengers with excellent access to each module.

FIGS. 5D to 5F show what can be achieved with modules like that shown in FIG. 3, since in these figures the first segment 28 is not operative. FIG. 5D shows a minimum length configuration of two modules (where the length is measured in the direction of the straight longer side 26). The other configurations (FIGS. 5E and 5F) are longer but narrower. Note that in FIG. 5F the length of the combination of the two modules is substantially equal to the length of the combination formed by the two modules shown in FIG. 5A, but the combination is narrower in FIG. 5F.

Note that in all of the configurations shown in FIGS. 5A to 5F, the straight longer sides 26 of the modules are always parallel to each other. This also applies to the FIG. 1 modules (see FIGS. 2A to 2C). In this way, by lining up pairs of modules one behind the other, it is possible to create a double row of modules between two aisles. Examples of this are shown in FIGS. 9 and 10 and are described in more detail later.

The perimeter of a module can consist of a wall that extends vertically from the floor of the cabin. This wall then delimits the space provided for a passenger during a journey. This space is equipped with a seat at the wider end. For a seated passenger, it is thus envisaged that the seat back will be placed along the larger or longer base 2 or 12 (FIG. 1 or 3) or the wider end 22. At the other end, i.e. at the narrower end 24 or a smaller or shorter base 4 or 14, the module can be equipped with an accessory such as a footrest, a luggage locker, a television, etc. This accessory preferably has a substantially horizontal surface at a height of approximately 40 to 60 cm above the floor. This surface can then be used as a low table or as a makeshift seat if the passenger wishes to talk to another passenger. If the seat with which the module is equipped can be converted into a bed, the accessory at the narrow end of the module can constitute the end of the bed intended to receive the passenger's feet. In this case, the accessory has a surface at substantially the same height as the seat cushion (within approximately 20 cm). This saves weight. A seat that can be converted into a bed is relatively heavy, and providing a fixed end, possibly serving as a housing for a television, a luggage locker or a folding seat, reduces the overall weight of the bed.

The wall around the module is made from a synthetic material, for example molded polyurethane, or a composite material. It can be covered with a fabric (or the like) matching the covering of the seat inside the module.

The wall around the module is preferably fixed to fixing rails in the floor. Rails for fixing seats are provided in all aircraft intended to carry passengers. Longitudinal rails are provided across the entire width of the cabin. Regularly spaced anchor points for fixing seats are provided along each rail, generally at a pitch of one inch (2.54 cm). The means for fixing the wall around the module are preferably identical to those conventionally used to fix seats to the rails.

The external dimensions of the module are from 1.80 m to 2.10 m for the length and from 0.50 m to 0.70 m for the width. These dimensions can comfortably receive a seated or stretched out passenger.

It is necessary to provide access to enable a passenger to enter the module. FIG. 6 shows a module corresponding to a FIG. 4 module with two identical openings 32. The first opening 32 is in the straight longer side 26 and the second opening 32 is in the second segment 30 of the module. Each of these identical openings are located near the narrower end 24.

FIG. 6 also shows two doors 34. Each of these doors 34 are adapted to close an opening 32. A single means of access to the module is generally all that is needed. Thus each module is generally equipped with one door 34. FIG. 7 shows a module in which a door 34 closes the opening 32 in the second segment 30. In FIG. 8, a door 34 closes the opening 32 in the straight longer side 26. Thus in both cases (FIGS. 7 and 8) there is obtained a module delimited around the whole of its perimeter by a vertical lateral wall extending to a height from 70 cm to 90 cm from the floor of the cabin, except at an access opening 32. For the requirements of modularity, the same door can be installed on a straight longer side 26 or on a second segment 30. The height of the wall is chosen so that, if the seat is convertible, it surrounds the sleeping surface to a height of approximately 20 cm to 30 cm, to isolate a sleeping passenger from his environment.

FIGS. 9 and 10 show examples of an arrangement of a cabin section with modules like those shown in FIGS. 7 and 8.

In FIG. 9, each module is equipped with a convertible seat 36, i.e. a seat that can be converted into a substantially horizontal support. As suggested above, a footrest 38 at the narrower end 24 cooperates with the convertible seat 36 to form a bed. Fixings of the same type are used to fix the convertible seat 36 and the wall of the corresponding module.

FIG. 9 shows a cabin section between two successive emergency exits (not shown). This cabin section is delimited laterally by cabin walls 40.

Individual modules are aligned in the cabin. There is thus a first row 42 of individual modules along a cabin wall 40 and a second row 44 of individual modules along the other cabin wall 40. At the center of the cabin are two groups 46. The groups 46 are formed of two rows of modules so as to form a succession of pairs of modules disposed head-to-tail and in contact with each other, two modules of the same pair having the same exterior contour. Each row is separated from an adjacent row or group by an aisle 48. The minimum width of the aisles 48 are standardized. It must allow easy circulation of passengers and a service cart, which is generally 16 inches (approximately 41 cm) wide.

The modules of the two rows 42 and 44 are disposed one behind the other, longitudinally relative to the cabin of the aircraft. Each module is fitted with a door 34 on the same side as the corresponding cabin wall. Here the individual modules are aligned so that the second segments 30 are aligned along the aisle 48. The second segments 30 each have an opening 32 providing access to the corresponding module. Thus, all the openings 32 of the modules of the two rows 42 and 44 are aligned along the corresponding aisle 48.

There could equally well be a row with the straight longer side 26 of each module disposed along the aisle 48. The straight longer sides 26 would then be aligned. The opening 32 of each module would therefore naturally be in the straight longer side 26, with the opening in the second segment 30 closed by a door 34.

The two groups 46 of modules are symmetrical with respect to the median longitudinal axis of the cabin section. In the situation shown here, the pairs of modules formed in these groups correspond to the configuration shown in FIG. 5E. In this case, the openings 32 in the second segments 30 of each module are closed by a door 34 and the openings 32 in the straight longer side 26 of each module are open. Each of these openings provides access from the corresponding module to an aisle 48.

Here the use of these modules provides a configuration in the cabin section with three aisles 48. This kind of configuration is totally unheard of in an aircraft. It produces a more attractive and open space, which is easier to evacuate. Moreover, any passenger wishing to leave or return to his seat has no need to disturb an adjacent passenger.

Furthermore, the use of these modules means that virtually the same number of passengers can be carried as in conventional configurations with the seats aligned in rows. Thus the cabin section shown in FIG. 9 corresponds to a cabin section that normally accommodates 22 seats that can be converted into a bed, when the seats are disposed in rows and columns with two aisles. As can be seen in FIG. 9, 20 passengers can be accommodated comfortably in the same aircraft section.

FIG. 10 shows a different cabin section arrangement. This figure shows two cabin walls 40 and three aisles 48. There are four groups 46 of modules according to the invention. The aisles 48 separate the groups 46 into pairs.

In this example of using modules according to the invention the modules are equipped only with a seat. The cabin section is that of an aircraft intended only for short-haul flights, for example.

The modules are disposed along the cabin wall in a configuration substantially corresponding to that shown in FIG. 5B. Thus, to leave or return to his seat, a passenger seated along the cabin wall 40 does not have to disturb his neighbor in the same group but farther along the corresponding aisle 48. Note the advantage of this grouping of modules. It is possible in this way to have the equivalent of a row of two seats along walls of the cabin without a passenger seated along the cabin wall 40 having to apologize when leaving or returning to his place.

Note also that in the configuration shown in FIG. 10 it is possible to use an individual module to fill up the space optimally. In FIG. 10, at one end of each row along a cabin wall 40 there is an individual module to fill in the remaining space.

With the configuration shown in FIG. 10 a cabin section can accommodate virtually as many passengers as an identical cabin section equipped with seats that can be converted into a bed disposed in conventional rows.

The present invention is not limited to the embodiments described above by way of nonlimiting example. It encompasses all other embodiments within the scope of the following claims that may suggest themselves to the person skilled in the art.

What is claimed is:

1. A seating module for an aircraft passenger, said seating module comprising an individual seat having a seat back, a seat cushion juxtaposed said seat back and a pair of arm rests straddling said seat cushion, said individual seat adapted to be oriented in a longitudinal direction of said aircraft; said individual seat having an elongate shape with said individual seat defining a wider end and a fitting defining a narrower end, said fitting facing said individual seat and spaced a predetermined distance therefrom, one side of said wider and narrower ends being connected by a lateral wall at least at the level of said seat cushion, the other side of said wider and narrower ends being connected by a side having a substantially straight segment extending from said narrower end toward said wider end and diverging from the opposite lateral wall to define an access opening therebetween and opposite to said lateral wall.

2. A seating module as claimed in claim 1, having the shape of a right-angle trapezium.

3. A seating module as claimed in claim 1, wherein said wider end defines a substantially rectilinear first end, said second narrower end defines a substantially rectilinear second end narrower than said rectilinear first end, and further comprising: a substantially straight side lateral wall connecting said one side of said rectilinear first end and said one side of said rectilinear second end, said straight side lateral wall being substantially perpendicular to said rectilinear first and second ends; and a side opposite said substantially straight side lateral wall connecting said rectilinear first and second ends, said side opposite said substantially straight side lateral wall having a first substantially straight segment extending from said rectilinear second end toward said rectilinear first end and diverging from said substantially straight side lateral wall and a second segment connecting a free end of said first end to said first substantially straight diverging segment.

4. A seating module as claimed in claim 3 wherein said second segment is substantially parallel to said substantially straight side lateral wall.

5. A seating module as claimed in claim 3 wherein said second segment extends from said rectilinear first end toward said rectilinear second end and diverges from said substantially straight side lateral wall.

6. A seating module as claimed in claim 5 wherein the divergence angle of said first segment is greater than the divergence angle of said second segment.

7. The seating module as claimed in claim 1 having a length from 1.80 m to 2.10 m.

8. The seating module as claimed in claim 1 having a maximum width from 0.50 m to 0.70 m.

9. The seating module as claimed in claim 1, wherein said seating module comprises a pair of seating modules, said pair of seating modules disposed head-to-tail and in contact with each other, said pair of seating modules having identical contours.

10. The pair of seating modules as claimed in claim 9 wherein each seating module has U-shaped ends and is in contact with the other module through at least a portion of one side of said wider end.

11. The pair of seating modules as claimed in claim 10 wherein the sides of said U-shaped ends of each seating module opposite the other end are aligned with each other, parallel to a direction common to said pair of seating modules.

12. The pair of seating modules as claimed in claim 9 wherein each seating module has U-shaped ends and is in contact with the other module through at least a portion of a side disposed between its ends.

13. The pair of seating modules as claimed in claim 9 wherein each seating module has U-shaped ends and is in contact with the other module through at least a portion of one side of said narrower end.

14. The seating module as claimed in claim 1, wherein said seating module comprises a row of seating modules, each said seating module of said row of seating modules defining identical spaces and disposed in alignment with each other with identical orientations.

15. The row of seating modules as claimed in claim 14, wherein two adjacent seating modules have their respective narrow ends opposing the respective wider ends of each adjacent seating module.

16. The seating module as claimed in claim 1, wherein said seating module comprises a group of seating modules formed of seating modules disposed in two rows to form a succession of pairs of seating modules.

17. The group of seating modules as claimed in claim 16 wherein said group of seating modules is arranged to form a plurality of rows of seating modules in an aircraft cabin.

18. The group of seating modules as claimed in claim 17 wherein two rows form a group of seating modules in an aircraft cabin.

19. The group of seating modules as claimed in claim 17 wherein a lateral row of seating modules are disposed along each wall of a cabin section of an aircraft.

20. The group of seating modules as claimed in claim 19 wherein said lateral row is part of a group of seating modules.

21. The group of seating modules as claimed in claim 19 further comprising at least one lateral aisle in said aircraft cabin section whereby a set of lateral rows are separated by said at least one lateral aisle.

22. The group of seating modules as claimed in claim 21 wherein said set of lateral rows consists of groups of seating modules separated in pairs by lateral aisles.

23. A seating module for an aircraft passenger, said seating module comprising an individual seat having a seat cushion, a seat back juxtaposed said seat cushion and arm rests straddling said seat cushion, said individual seat adapted to be oriented in a longitudinal direction of the aircraft; a fitting facing and spaced at a distance from said individual seat, said fitting being narrower than said individual seat; and a lateral wall extending between one side of said individual seat and one side of said fitting at least at the level of said seat cushion, the other side of said wider end and narrower end being connected by a side having a substantially straight segment extending from said narrower end toward said wider end and diverging from the opposite lateral wall to define an access opening there between, such that said lateral wall, said individual seat and said fitting define an elongate space having a wider end occupied by said individual seat, a narrower end occupied by said fitting.

24. The seating module as claimed in claim 23 wherein said elongated space has a contour that widens from each end.

25. The seating module as claimed in claim 24 wherein said narrower end widens less than said wider end so that said space has an area of maximum width that is nearer said wider end than said narrower end.

26. The seating module as claimed in claim 23 wherein said wider and narrower ends each have a side that is substantially aligned with a side of the other end.

27. The seating module as claimed in claim 26 wherein said lateral wall is disposed between the sides opposite those that are substantially aligned with each other.

28. The seating module as claimed in claim 23 wherein said wider and narrower ends of said elongate space are each defined by a U-shaped end wall.

29. The seating module as claimed in claim 28 wherein said lateral wall extends from one end of said U-shaped end wall to the other.

30. The seating module as claimed in claim 28 wherein said U-shaped end walls are each provided with fixing means for securely fixing them to longitudinal fixing rails disposed in the floor of the cabin.

31. The seating module as claimed in claim 30 wherein said U-shaped end walls have a height from 0.45 m to 1.50 m.

32. The seating module as claimed in claim 23 wherein said lateral wall is of variable height.

33. The seating module as claimed in claim 23 wherein said fitting has a surface at a height equal to that of said seat cushion to within approximately 10 centimeters.

34. The seating module as claimed in claim 33 wherein said surface is at a height from 0.45 m to 0.60 m.

35. The seating module as claimed in claim 23 wherein said individual seat is a convertible seat and wherein said seat back can be inclined toward the rear.

36. The seating module as claimed in claim 35 wherein said seat back can be inclined as far as a horizontal configuration.

37. The seating module as claimed in claim 1, wherein said seating module comprises a row of seating modules, each said seating module of said row of seating modules defining identical spaces and disposed in alignment with each other with identical orientations, such that said access openings of said seating modules are aligned with each other.

38. The seating module as claimed in claim 23 further comprising an access opening between said fitting and said seat cushion opposite said lateral wall.

39. The seating module as claimed in claim 38 wherein said access opening has a horizontal width equal to the height of said lateral wall.

40. The seating module as claimed in claim 38 wherein said elongated space has a contour that widens from each end.

41. The seating module as claimed in claim 38 wherein said narrower end widens less than said wider end so that said space has an area of maximum width that is nearer said wider end than said narrower end.

42. The seating module as claimed in claim 38 wherein said wider and narrower ends each have a side that is substantially aligned with a side of the other end.

43. The seating module as claimed in claim 38 wherein said access opening has a horizontal dimension equal to the width of said lateral wall.

44. A seating module for an aircraft passenger, said seating module adapted to be oriented in a longitudinal direction of said aircraft, said seating module comprising:
    an individual seat having an elongated shape defining a first predetermined wide end and a second predetermined narrower width end, one side of each of said first predetermined wide end and said second predetermined narrower width end being connected by a substantially straight segment extending from said one side of said second predetermined narrower width end towards said one side of said first predetermined wide end, the opposite side of each of said first predetermined wide end and said second predetermined narrower width end being connected by a straight diverging segment extending from said one side of each of said first predetermined wide end and said second predetermined narrower width end to define an apex point at the intersection of said straight diverging segments.

45. A seating module for an aircraft passenger, said seating module adapted to be oriented in a longitudinal direction of said aircraft, said seating module comprising:
    an individual seat having an elongated shape defining a first predetermined wide end and a second predetermined narrower width end, one side of each of said first predetermined wide end and said second predetermined narrower width end being connected by a substantially straight segment lateral wall extending from said one side of said second predetermined narrower width end towards said one side of said first predetermined wide end, the opposite side of one of said first predetermined wide end and said second predetermined narrower width end being connected by a side having a substantially straight segment diverging from said one side and extending from said opposite side of said one of said first predetermined wide end and said second predetermined narrower width end towards the opposite side of the other of said first predetermined wide end and said second predetermined narrower width end to define an access opening opposite to said lateral wall.

\* \* \* \* \*

UNITED STATES PATENT AND TRADEMARK OFFICE
CERTIFICATE OF CORRECTION

PATENT NO. : 7,025,306 B2  Page 1 of 4
APPLICATION NO. : 10/441399
DATED : April 11, 2006
INVENTOR(S) : Bruno Saint Jalmes It is certified that error appears in the above-identified patent and that said Letters Patent is hereby corrected as shown below:

In the Second Column of the Title Page under the heading Abstract, item 57 Line 12, kindly delete "elongate" and insert --elongated--.

In the drawings, Sheet 3, Fig. 9, please insert reference character --40-- and the associated leader line.

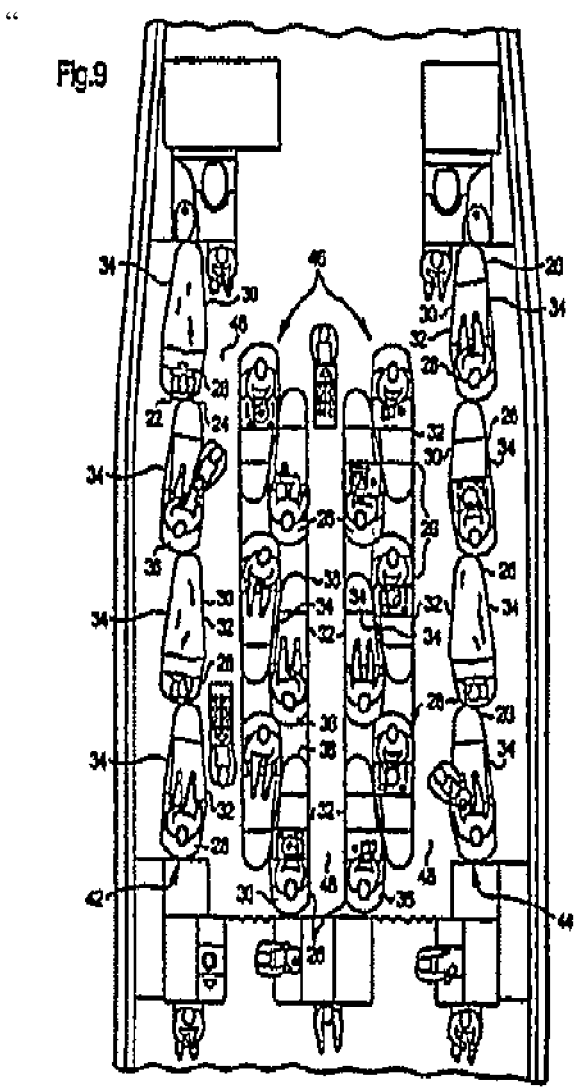

UNITED STATES PATENT AND TRADEMARK OFFICE
CERTIFICATE OF CORRECTION

PATENT NO. : 7,025,306 B2  Page 2 of 4
APPLICATION NO. : 10/441399
DATED : April 11, 2006
INVENTOR(S) : Bruno Saint Jalmes It is certified that error appears in the above-identified patent and that said Letters Patent is hereby corrected as shown below:

should be -- 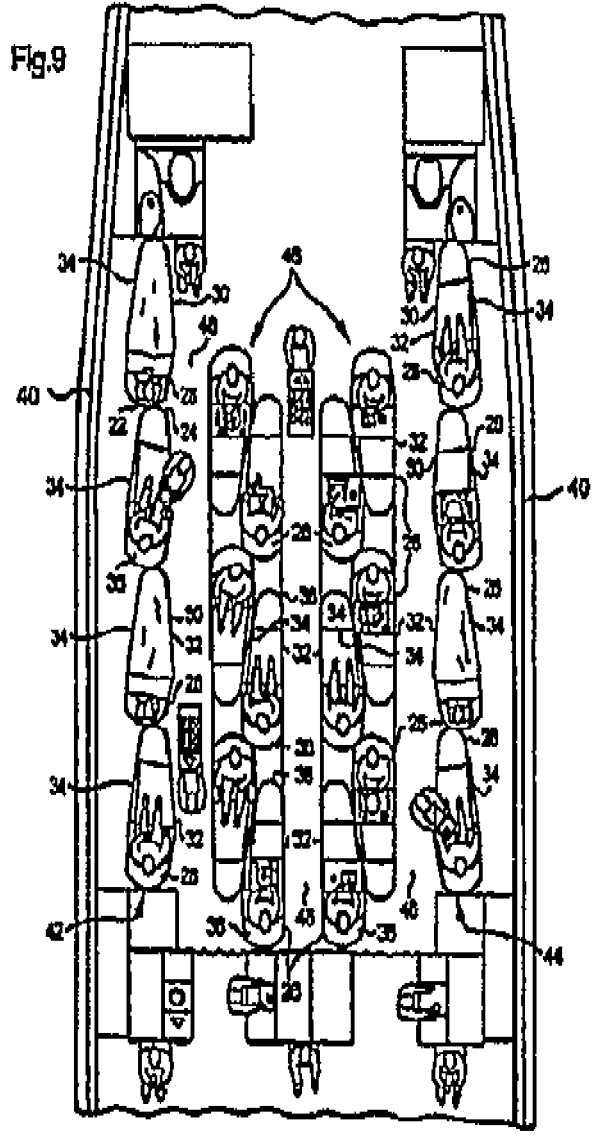 --

UNITED STATES PATENT AND TRADEMARK OFFICE
CERTIFICATE OF CORRECTION

PATENT NO. : 7,025,306 B2
APPLICATION NO. : 10/441399
DATED : April 11, 2006
INVENTOR(S) : Bruno Saint Jalmes It is certified that error appears in the above-identified patent and that said Letters Patent is hereby corrected as shown below:

Column 1, Line 1, before "INDIVIDUAL" kindly insert --AN--.

Column 2, Line 13, kindly delete ";" and insert --,--.

Column 3, Line 51, after "bases", kindly insert --2 and 4--.

Column 4, Line 21, kindly delete "2" and insert --12--.

Column 4, Line 25, kindly delete "and 2" and insert -- ,2A, 2B, and 2C--.

Column 5, Line 31, after "14", kindly insert --(Fig.1 or 3)--.

Column 5, Line 39, kindly delete "narrow end" and insert --narrower end 24--.

Column 6, Line 2, after "openings", kindly insert --32--.

Column 6, Line 49, after "wall", kindly insert --40--.

Column 7, Line 2, after "openings", kindly insert --32--.

Column 7, Line 27, after "wall", kindly insert --40--.

Column 8, Line 40, Claim 10, after "each", kindly insert --said--.

Column 8, Line 44, Claim 11, after "each", kindly insert --said--.

Column 8, Line 49, Claim 12, after "each", kindly insert --said--.

Column 8, Line 53, Claim 13, after "each", kindly insert --said--.

Column 8, Line 63, Claim 15, kindly delete "narrow" and insert --said narrower--.

Column 8, Line 63, Claim 15, after "respective", kindly insert --said--.

Column 8, Line 63, Claim 15, after "each", kindly insert --said--.

Column 9, Line 1, Claim 16, after "of", kindly insert --said--.

Column 9, Line 7, Claim 18, kindly delete "a" and insert --said--.

UNITED STATES PATENT AND TRADEMARK OFFICE
CERTIFICATE OF CORRECTION

PATENT NO. : 7,025,306 B2
APPLICATION NO. : 10/441399
DATED : April 11, 2006
INVENTOR(S) : Bruno Saint Jalmes It is certified that error appears in the above-identified patent and that said Letters Patent is hereby corrected as shown below:

Column 9, Line 21, Claim 22, after "by", kindly insert --said--.

Column 9, Line 37, Claim 23, kindly delete "elongate" and insert --elongated--.

Column 9, Line 53, Claim 28, kindly delete "elongate" and insert --elongated--.

Signed and Sealed this

Nineteenth Day of June, 2007

JON W. DUDAS
*Director of the United States Patent and Trademark Office*